United States Patent
Briscoe et al.

(10) Patent No.: US 11,557,944 B2
(45) Date of Patent: Jan. 17, 2023

(54) ROTOR ASSEMBLY METHOD AND SYSTEM EMPLOYING CENTRAL MULTI-TASKING ROBOTIC SYSTEM

(71) Applicants: Ford Global Technologies, LLC, Dearborn, MI (US); ABB Inc., Auburn Hills, MI (US)

(72) Inventors: Mark E Briscoe, Milford, MI (US); Nick Sochacki, Ann Arbor, MI (US); Al Marrocco, Windsor (CA); Jeffrey Cameron, Lake Orion, MI (US); Michael Mollan, Lake Orion, MI (US)

(73) Assignees: Ford Global Technologies, LLC, Dearborn, MI (US); ABB, Inc., Auburn Hills, MI (US)

( * ) Notice: Subject to any disclaimer, the term of this patent is extended or adjusted under 35 U.S.C. 154(b) by 1 day.

(21) Appl. No.: 17/161,121

(22) Filed: Jan. 28, 2021

(65) Prior Publication Data
US 2022/0239204 A1 Jul. 28, 2022

(51) Int. Cl.
*B23P 21/00* (2006.01)
*H02K 15/03* (2006.01)
(Continued)

(52) U.S. Cl.
CPC ............ *H02K 15/03* (2013.01); *B25J 9/0084* (2013.01); *B25J 11/005* (2013.01); *H02K 1/276* (2013.01); *Y10T 29/53313* (2015.01)

(58) Field of Classification Search
CPC ....... B64C 27/32; B64C 27/12; F04D 29/181; H02K 15/02; Y10T 29/49009;
(Continued)

(56) References Cited

U.S. PATENT DOCUMENTS 5,323,530 A * 6/1994 Goto ..................... B23P 19/04
29/888.023
7,503,108 B2 * 3/2009 Zolotarev ................ B23Q 5/40
29/757
(Continued)

FOREIGN PATENT DOCUMENTS

| CN | 105490473 | * | 1/2016 | ............. H02K 15/02 |
| CN | 105490473 | | 11/2017 | |

(Continued)

OTHER PUBLICATIONS

DELO, Electric Motor Magnet Bonding: Increasing UPH with Fixation-Aid-Free Process Design, Video Images.

*Primary Examiner* — Thiem D Phan
(74) *Attorney, Agent, or Firm* — Burris Law, PLLC

(57) ABSTRACT

A rotor assembly system for a manufacturing cell includes a central robotic system comprising a multi-axial central robot and a conveyor platform and one or more multi-axial auxiliary robotic systems secured at one or more locations within the cell. The conveyor platform is operable to move the central robot within the cell. The central robotic system and the one or more auxiliary robotic systems are configured to perform a plurality of rotor manufacturing processes on at least one rotor component in coordination with one another, and the central robotic system is configured to transfer the at least one rotor component between one or more rotor manufacturing processes of the plurality of rotor manufacturing processes.

18 Claims, 3 Drawing Sheets

(51) Int. Cl.
*B25J 9/00* (2006.01)
*B25J 11/00* (2006.01)
*H02K 1/276* (2022.01)

(58) Field of Classification Search
CPC ......... Y10T 29/49012; Y10T 29/53313; Y10T 29/53143; Y10T 29/49075
USPC ......... 29/771, 240, 407.02, 564.1, 596, 598, 29/732, 757, 893.1
See application file for complete search history.

(56) References Cited

U.S. PATENT DOCUMENTS

| | | |
|---|---|---|
| 7,854,056 B2 | 12/2010 | Watanabe et al. |
| 9,240,709 B2 | 1/2016 | Kato et al. |
| 2018/0287439 A1 | 10/2018 | Degner et al. |
| 2019/0089231 A1 | 3/2019 | Ishimatsu et al. |

FOREIGN PATENT DOCUMENTS

| | | |
|---|---|---|
| CN | 104993654 | 10/2018 |
| CN | 105656260 | 1/2019 |
| CN | 109586529 | 4/2019 |
| JP | 5799605 | 10/2015 |
| JP | 6040508 | 12/2016 |

* cited by examiner

ROTOR ASSEMBLY METHOD AND SYSTEM EMPLOYING CENTRAL MULTI-TASKING ROBOTIC SYSTEM

CROSS-REFERENCE TO RELATED APPLICATIONS

This application is related to applications filed concurrently herewith titled "METHOD AND SYSTEM FOR ASSEMBLING A ROTOR STACK FOR AN ELECTRIC MOTOR," as filed in U.S. patent application Ser. No. 17/161,084 on Jan. 28, 2021, "METHOD AND APPARATUS FOR TRANSFER MOLDING OF ELECTRIC MOTOR CORES AND MAGNETIZABLE INSERTS," as filed in U.S. patent application Ser. No. 17/161,175, on Jan. 28, 2021, and "INTEGRATED ROBOTIC END EFFECTORS HAVING END OF ARM TOOL GRIPPERS," as filed in U.S. patent application Ser. No. 17/160,762, on Jan. 28, 2021 which are commonly assigned with the present application and the contents of which are incorporated herein by reference in their entireties.

FIELD

The present disclosure relates to assembly of a rotor and more particularly to, assembly of a rotor formed of multiple rotor cores.

BACKGROUND

The statements in this section merely provide background information related to the present disclosure and may not constitute prior art.

Recent advancements in electric converters such as electric motors and/or generators relate not only to performance, but also to manufacturing, as the need for electric converters has increased in various industries including automotive. More particularly, in the automotive industry, electric motors can vary across different platforms since powertrain requirements of a small vehicle is different from that of a truck. For example, with respect to the rotor of the electric motor, the overall size of the rotor (e.g., diameter, height, etc.) to the type of magnets installed, can vary platform-to-platform. Such variations can result in complex rigid assembly lines that impede dynamic flexible configurations.

Furthermore, rotors are complex assemblies, typically having a plurality of rotor cores with a plurality of magnets disposed in pockets of the rotor cores. Such a construction can be seen, by way of example, in U.S. Publication No. 2018/0287439, which is commonly owned with the present application and the contents of which is incorporated herein by reference in its entirety.

These and other issues related to the assembly of a rotor are addressed by the present disclosure.

SUMMARY

This section provides a general summary of the disclosure and is not a comprehensive disclosure of its full scope or all of its features.

In one form, the present disclosure is directed to a rotor assembly system for a manufacturing cell. The system includes a central robotic system comprising a multi-axial central robot and a conveyor platform and one or more multi-axial auxiliary robotic systems secured at one or more locations within the cell. The conveyor platform is operable to move the central robot within the cell. The central robotic system and the one or more auxiliary robotic systems are configured to perform a plurality of rotor manufacturing processes on at least one rotor component in coordination with one another, and the central robotic system is configured to transfer the at least one rotor component between one or more rotor manufacturing processes of the plurality of rotor manufacturing processes.

The following provides one or more variations of this rotor assembly system, which may be implemented individually or in any combination.

In some variations, the one or more auxiliary robotic systems includes an insert assembly robotic (IAR) system including a multiaxial insert assembly robot to perform, in association with the central robotic system, a core stack assembly process as part of the plurality of rotor manufacturing processes. For the core stack assembly process, the central robotic system is configured to place a rotor core from among a plurality of rotor cores on a mandrel, and the IAR system is configured to, for each of the plurality of rotor cores, place a plurality of magnetizable inserts into a plurality of cavities in the rotor core.

In some variations, the central robotic system is configured to perform a selected rotor manufacturing processes among the plurality of rotor manufacturing processes while the IAR system places magnetizable inserts into the rotor core and return to the core stack assembly process prior to all of the magnetizable inserts being in the cavities.

In some variations, the one or more auxiliary robotic systems includes a mold-press robotic (MPR) system including a multi-axial mold-press robot to perform, in association with the central robotic system, a mold-press process as part of the plurality of rotor manufacturing processes, the mold-press process is performed subsequent to the core stack assembly process.

In some variations, the system further includes a control system configured to control and coordinate movement of the central robotic system, the IAR system, and the MPR system.

In some variations, the plurality of rotor manufacturing processes includes a pre-mold-press process performed prior to the mold-press process and a post-mold-press process performed after the mold-press process.

In some variations, the central robotic system is configured to perform a selected rotor manufacturing processes among the plurality of rotor manufacturing processes while the IAR system places magnetizable inserts into the rotor core and return to the core stack assembly process prior to all of the magnetizable inserts being in the cavities. The selected rotor manufacturing process is the pre-mold-press process, mold-press process, the post-mold-press process, or a combination thereof.

In some variations, the pre-mold-press process includes a first weighing process of the rotor component, a preheating process of the rotor component, or a combination thereof. The post-mold-press process includes a press tool removal process, a second weighing process of the rotor component, a cleaning process, or a combination thereof.

In some variations, for the mold-press process, the MPR system is configured to position a press tool onto the rotor component, the central robotic system is configured to transfer the rotor component with the press tool to a transfer mold press and remove the rotor component with the press tool after a press operation by the transfer mold press, and the MPR system is configured to remove the press tool from the rotor component.

In some variations, the one or more auxiliary robotic systems includes a mold-press robotic (MPR) system including a multi-axial mold-press robot to perform a mold-press process as part of the plurality of rotor manufacturing processes in association with the central robotic system.

In some variations, the one or more auxiliary robotic systems includes an insert assembly robotic (IAR) system including a multiaxial insert assembly robot to perform, in association with the central robotic system, a core stack assembly process as part of the plurality of rotor manufacturing processes, the core stack assembly process being performed prior to mold-press process.

In one form, the present disclosure is directed toward, a method of assembling a rotor. The method includes providing a central robotic system having a multi-axial central robot and a conveyor platform at a manufacturing cell, where the conveyor platform is operable to move the central robot within the cell. The method further includes providing one or more multi-axial auxiliary robotic systems secured at one or more locations within the manufacturing cell. The central robotic system and the one or more auxiliary robotic systems are configured to perform a plurality of rotor manufacturing processes on at least one rotor component in coordination with one another, and the central robotic system is configured to transfer the at least one rotor component between one or more rotor manufacturing processes among the plurality of rotor manufacturing processes.

The following provides one or more variations of this method, which may be implemented individually or in any combination.

In some variations, the one or more auxiliary robotic systems includes an insert assembly robotic (IAR) system including a multi-axial insert assembly robot to perform, in association with the central robotic system, a core stack assembly process as part of the plurality of rotor manufacturing processes. For the core stack assembly process, the method further includes placing, by the central robotic system, a rotor core from among a plurality of rotor cores on a mandrel, and for each of the plurality of rotor cores, placing, by the IAR system, a plurality of magnetizable inserts into a plurality of cavities in the rotor core.

In some variations, the method further includes performing, by the central robotic system, a selected rotor manufacturing processes among the plurality of rotor manufacturing processes while the IAR system places magnetizable inserts into the rotor core, and returning the central robotic system to the core stack assembly process prior to all of the magnetizable inserts being placed in the cavities.

In some variations, the one or more auxiliary robotic systems further includes a mold-press robotic (MPR) system including a multi-axial mold-press robot to perform, in association with the central robotic system, a mold-press process as part of the plurality of rotor manufacturing processes, the mold-press process is performed subsequent to the core stack assembly process.

In some variations, for the mold-press process, the method further includes positioning, by the MPR system, a press tool onto the rotor component, transferring, by the central robotic system, the rotor component with the press tool to a transfer mold press, removing, by the central robotic system, the rotor component with the press tool after a press operation by the transfer mold press, and removing, by the MPR system, the press tool from the rotor component.

In some variations, the plurality of rotor manufacturing processes includes a pre-mold-press process performed prior to the mold-press process and a post-mold-press process performed after the mold-press process.

In some variations, the pre-mold-press process includes a first weighing process of the rotor component, a preheating process of the rotor component, or a combination thereof. The post-mold-press process includes a press tool removal process, a second weighing process of the rotor component, a cleaning process, or a combination thereof.

In one form, the present disclosure is directed to a rotor assembly system for a manufacturing cell. The system includes a cell comprising a plurality of stations to perform a plurality of rotor forming processes on a rotor component, a central robotic system comprising a multi-axial central robot and a conveyor platform having the central robot secured thereon, an insert assembly robotic (IAR) system, and a mold-press robotic (MPR) system. The conveyor platform is operable to transversely move the central robot along the cell. The insert assembly robotic (IAR) system includes a multi-axial insert assembly robot to perform, in association with the central robotic system, a core stack assembly process as part of the plurality of rotor manufacturing processes, where the plurality of stations includes a core stack station and the insert assembly robot is securely disposed at the core stack station. The mold-press robotic (MPR) system includes a multi-axial mold-press robot to perform, in association with the central robotic system, a mold-press process, as part of the plurality of rotor manufacturing processes. The plurality of stations includes a mold-press station and the mold-press robot is securely disposed at the mold-press station. The central robotic system is configured to travel to the core stack station and the mold-press station.

In some variations, the plurality of rotor manufacturing processes includes a pre-mold-press process performed prior to the mold-press process and a post-mold-press process performed after the mold-press process. The pre-mold-press process includes a first weighing process of the rotor component, a preheating process of the rotor component, or a combination thereof. The post-mold-press process includes a press tool removal process, a second weighing process of the rotor component, a cleaning process, or a combination thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
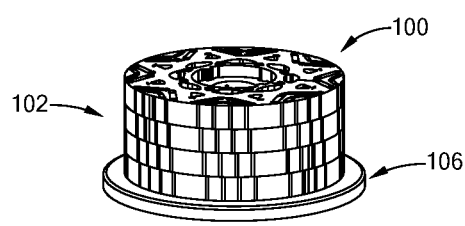
FIG. 1A is a perspective view of a rotor assembly in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In an exemplary application, a rotor for an electric converter, such as an electric motor or a generator, comprises a plurality of rotor cores and a plurality of magnets disposed within the rotor cores, where the rotor cores and the plurality of magnets are fixedly secured to one another. The present disclosure provides a rotor assembly system for a manufacturing cell, where the system includes a central multitasking robotic system operable to move within the cell and one or more auxiliary robotic systems secured within the cell at designated locations. The central robotic system and the auxiliary robotic system(s) are configured to perform a plurality of rotor manufacturing processes on at least one rotor component in coordination with one another. The rotor assembly system described herein may be employed for different size rotor cores and/or magnetizable inserts and using the same or substantially the same robotic systems. While the rotor assembly system is described in association with an electric motor, the same method can be employed with other suitable electric converters, such as a generator.

Figure 1B:
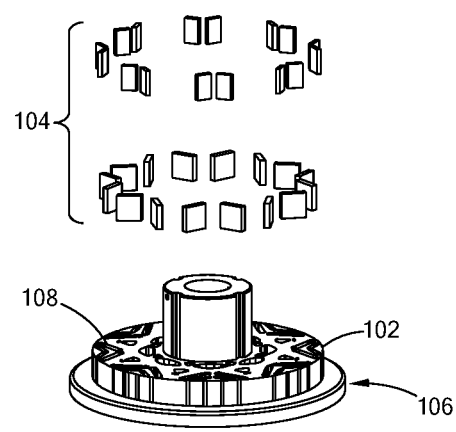
FIG. 1B is an exploded view of magnetizable inserts and a rotor core disposed on a mandrel in accordance with the present disclosure.

Referring to FIGS. 1A and 1B, a rotor assembly 100 of an electric motor includes a plurality of rotor cores 102 and a plurality of magnetizable inserts 104 that are disposed in the rotor cores 102. The rotor cores 102 are stackingly and coaxially arranged with one another about a mandrel 106. Each rotor core 102 defines a plurality of cavities 108 for receiving the plurality of magnetizable inserts 104. The magnetizable inserts 104 include a material(s) having ferromagnetic properties such as, but not limited to, iron, neodymium, and nickel. Accordingly, the magnetizable inserts do not exhibit magnetic properties during the rotor assembly, and only become magnets after undergoing a magnetizing process performed after the rotor is assembled. Once stacked, the magnetizable inserts are secured within the cavities and the cores are secured to one another via a molding-press process. While specific examples of the rotor cores 102 and the magnetizable inserts 104 are provided, the rotor cores may be configured in other suitable ways.

As you used herein, the term "rotor component" is employed to refer to a rotor being assembled (i.e. a rotor workpiece) during the various rotor assembly stages described herein and can include rotor core(s) and magnetizable insert(s) disposed about the mandrel.

Figure 2:
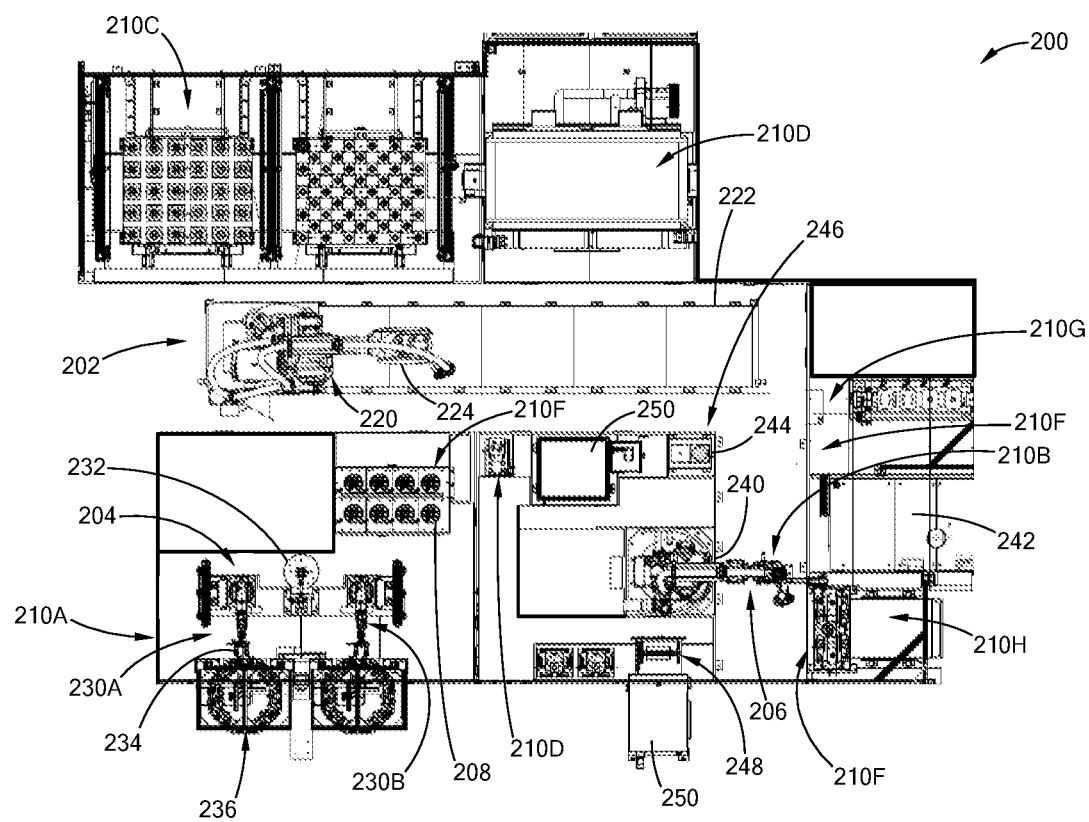
FIG. 2 illustrates an exemplary layout of a rotor assembly cell in accordance with the present disclosure.

Referring to FIG. 2, a rotor assembly cell is schematically illustrated and generally indicated by reference 200. The rotor assembly cell 200 includes a central robotic system 202 and multiple auxiliary robotic systems 204 and 206 configured to perform a plurality of rotor manufacturing processes on one or more rotor components an example of which is indicated by reference number 208. In one form, the cell 200 may include a plurality of stations 210 (reference number 210A to 210H in FIG. 2) to perform the rotor manufacturing processes on the rotor component and the stations may include a core stack station 210A and a mold-press station 210B. The cell 200 may include other stations, such as a core staging station 210C, and should not be limited to the examples provided herein. In addition, as used herein, the term station captures an area of the cell at which a rotor manufacturing process is being performed.

The central robotic system 202 includes a central robot 220 and a conveyor platform 222 operable to move the central robot 220 within the cell 200. In one form, the central robot 220 is a multiaxial (e.g., six axis) industrial robotic arm with an end-of-arm tool 224 configured to hold the rotor component and has an integrated load cell to provide force feedback. More specifically, in one form, the central robotic system 202 employs force control feedback to control operation of the central robot 220 as it moves and/or manipulates the rotor components during the rotor manufacturing processes. An exemplary central robotic system employing force control feedback is provided in co-pending application titled "METHOD AND APPARATUS FOR ASSEMBLING A ROTOR STACK FOR AN ELECTRIC MOTOR," which is commonly owned and incorporated herein by reference and Referred to as "co-pending Rotor Stack Application" hereinafter. In one variation, the central robot 220 may be another suitable multiaxial industrial robotic arms and may not employ integrated load cell for force feedback.

The conveyor platform 222 is configured to support and automatically move the central robot 220 within the cell, so that the central robot 220 may access one or more stations 210 to perform one or more rotor manufacturing process. In one form, the conveyor platform 222 is provided to extend along a single axis. Alternatively, the conveyor platform 222 may be configured as a uniform multiaxial platform to seamlessly traverse the central robot 220 within the cell 200 (e.g., an autonomous mobile robot platform).

The multiple auxiliary robotic systems 204 and 206 includes an insert assembly robotic (IAR) system (hereinafter "IAR system 204") and a mold-press robotic (MPR) system (hereinafter "MPR system 206") disposed at the core stack station 210A and the mold-press station 210B respectively. While multiple auxiliary robotic systems are illustrated, the cell 200 may include one or more auxiliary robotic systems based on the robot manufacturing processes to be performed.

The IAR system 204 is configured to perform, as part of the rotor manufacturing processes, a core stack assembly process to assemble a plurality of rotor cores and plurality of magnetizable inserts in cooperation with the central robotic system 202. In one form, the IAR system 204 includes a first insert assembly (IA) robot 230A and a second IA robot 230B (collectively "IA robot 230") secured to the core stack station 210A. In an exemplary application, the IA robots 230 are multiaxial (e.g., six axis) industrial robotic arms with end-of-arm tools having gripper end-effectors with integrated load cells to provide force feedback. That is, similar to the central robotic system, the IAR system 204 employs force feedback control to control the IA robots for performing the core stack assembly process. While two IA robots are illustrated, the IAR system 204 may include one or more IA robots. In another variation, the IA robots may be other suitable multiaxial industrial robotic arms and may not employ integrated load cells for force feedback.

In one form, during the core stack assembly, the central robotic system 202 places a rotor core on the mandrel disposed on a worktable 232, and the IAR system 204 is configured to, for each rotor core, place a plurality of magnetizable inserts into a plurality of cavities in the rotor core. For example, the IA robots 230 include one or more two-finger grippers 234 configured to retrieve and grip one or more magnetizable insert from an insert dispensing device 236 such as, but not limited to, one or more insert cartridge feeders. An exemplary application of the core stack assembly process is provided in co-pending Rotor Stack Application. Once, the magnetizable inserts are placed, the central robot 220 acquires another rotor core from the core staging area 210C and places it onto the mandrel or transfers the rotor component if all of the rotor cores are assembled to the next process of the rotor manufacturing process.

While the IAR system 204 places the magnetizable inserts into the cavities, the central robotic system 202 may perform another rotor manufacturing process. That is, the central robotic system 202 and the IAR system 204 work in a synchronized manner in which the IAR system 204 places the magnetizable inserts, and in an exemplary application, the central robotic system 202 returns to the core stack station 210A prior to all of the magnetizable inserts being in the cavities to position the next rotor core onto the mandrel or transfer the rotor component.

The MPR system 206 is configured to perform a mold-press process as part of the rotor manufacturing processes to secure the magnetizable inserts within rotor cores and includes a mold-press robot 240 secured at the mold-press station 210B. In one form, the mold-press robot 240 is a multiaxial industrial robotic arm with an end-of-arm tool having an integrated load cell providing force feedback. In one form, the end-of-arm tool is configured as a flexible gripper tool for holding and transferring different type of objects such as, but not limited to, a press tool and a polymer preform for the mold-press process. In addition to the mold-press robot 240, the mold-press station 210B further includes a transfer molding press 242 to displace a polymer preform into the rotor component (i.e., a rotor core stack with magnetizable inserts). In one variation, the mold-press robot may be another suitable multiaxial industrial robotic arms and may not employ integrated load cell for force feedback.

In one form, during the mold-press process, the central robotic system 202 is configured to move the rotor component previously assembled at the core stack station 210A to the mold-press station 210B, where the mold-press robot 240 is configured to move a press tool 244 from a tool staging area 246 and place the press tool onto the rotor component. The central robotic system 202 is configured to move the rotor component having the press tool to the transfer molding press 242 and the mold-press robot 240 is configured to acquire a polymer preform (not shown) from preform staging area 248 and place the polymer preform into the transfer molding press 242. The transfer molding press 242 is operable to displace the polymer preform such that the polymer preform changes state and flows radially and then axially through the cavities of the rotor cores (i.e., a press operation).

The mold-press process may include additional steps and thus, should not be limited to the steps provided herein. For example, the mold-press process may include operations for pre-heating the upper press tool and/or the polymer preform prior to the mold-press by the transfer molding press 242. Accordingly, the mold-press station 210B may include one or more ovens 250 for heating the press tool and/or the polymer preform, respectively. In such exemplary process, the mold-press robot 240 is configured to move the upper tool and the preform to and/or from respective ovens 250.

In one form, the rotor manufacturing processes includes pre-mold-press processes and/or post-mold-press processes as part of the rotor manufacturing process. More particularly, the pre-mold-press processes include, but is not limited to weighing the rotor component subsequent of the core stack assembly (i.e., weighing process) and/or preheating the rotor component by positioning the rotor component in an oven (i.e., preheating process). In one form, the post-mold-press processes include, but is not limited to: cooling the rotor component with the press tool at a cooling area (i.e., cooling process), removing the press tool from the rotor component (i.e., press tool removal process), weighting the rotor component subsequent to mold-press process (i.e., weighing process), and/or cleaning the press tools (i.e., cleaning process). To perform the pre-mold-press and/or the post-mold-press processes the cell 200 may include, auxiliary stations, such as a weighing station 210D, rotor preheating station 210E, one or more cooling station 210F, a trim station 210G, and/or one or more tool cleaning stations 210H.

In one form, the central robotic system 202 is configured to perform one or more of the pre-mold-press process and/or one or more of the post-mold-press presses. For example, the central robotic system 202 is configured to perform the following as part of the pre-mold-press processes: pick-up and move the rotor component from the core stack station 210A to a scale at the weight station 210D to weight the rotor component; move the rotor component from the weight station 210D to an oven of the rotor preheating station 210D to preheat the rotor component; and transfers the heated rotor component to the mold-press station 210B to perform the mold-press process in association with the MPR system 206, as described above.

After the mold-press process, the central robotic system 202 is configured to perform the one or more of the following as part of the post-mold-press processes: transfer the rotor-component with the press tool to the cooling station 210F; transfer the rotor component to the scale at the weight station 210D to weigh the rotor component; transfers the rotor component to the trim station 210G to remove excess mold; transfer the rotor component (e.g., molded rotor stack) to the cooling station 210F (e.g., cooling station 210 is proximity to the core stack station 210A. In one form, in addition to the central robotic system 202, the MPR system 206 is configured to perform one or more of the following as part of the post-mold-press process, remove the press tool from the rotor component and transfer the press tool to the cleaning station 210H.

An exemplary mold-press process and one or more pre-mold-press and/or post-mold-press processes are provided in co-pending application titled "METHOD AND APPARATUS FOR TRANSFER MOLDING OF ELECTRIC MOTOR CORES AND MAGNETIZABLE INSERTS," which is commonly owned and incorporated herein by reference and Referred to as "co-pending Transfer Molding Application" hereinafter. With the processes described therein, the press tool is provided in two parts, a lower press tool and the upper press tool. In one form, with the cell 200, the central robotic system 202 is configured to manipulate/handle the lower press tool by assembling the lower press tool with the rotor component prior to performing the pre-mold-press processes and the MPR system 206 is configured to handle the upper press tool. For example, the central robotic system 202 is configured to place the rotor component with the lower press tool in the oven of the rotor preheating stations 210D. After the mold-press process, the central robotic system 202 is configured to remove the lower press tool from rotor component, while the MPR system 206 is configured to remove the upper press tool. Accordingly, the both central robotic system 202 and the MPR system 206 are configured to have end-of-arm tools that allow the respective robots to handle various objects without requiring tool change.

In addition to or in lieu of one or more of the examples provided herein, the pre-mold-press processes and post-mold-process may include other processes and should not be limited to the examples provided herein. For example, the post-mold-process may include an inspection process of the press tool in which the MPR system 206/central robotic system 202 moves/transfers the press tool to an inspection area to determine if the molded material is sufficiently removed from the respective tool. In addition, while specific locations for various stations are depicted in FIG. 2, the stations can be arranged in various suitable manner and is not limited to the example illustrated. In addition, while specific auxiliary stations are identified, the cell 200 may include other stations based on the rotor manufacturing processes and should not be limited to the examples provided herein.

In an exemplary application, the central robotic system 202 and the auxiliary robotic systems are synchronized with one another, such that the central robotic system 202 is controlled to perform processes in coordination with the auxiliary robotic systems. Specifically, in one form, the central robotic system 202 is configured to assist in the stacking of the rotor cores with the IAR system 204 and assist in the mold-press process of the rotor component with the MPR system 206 in a seamless coordinated manner with little or no delay in assisting the other auxiliary system 204 and 206. For example, the central robotic system 202 is configured to assist in placing the rotor component with the press tool in the transfer molding press 242 and return to the core stack station 210A prior to the IAR system 204 completing the placement of the magnetizable inserts. Similarly, the central robotic system 202 is configured to place the rotor core onto the mandrel and return to the mold-press station 210B to remove the rotor component with the press tool from the transfer mold press 242, so that the MPR system 206 may further process the press tool.

Figure 3A:
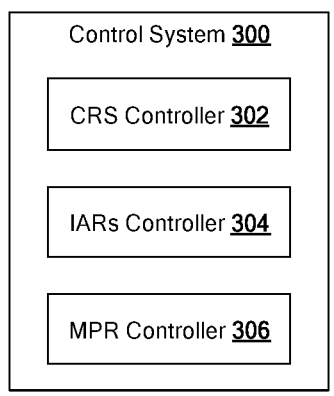
FIGS. 3A and 3B are block diagrams of control system in accordance with the present disclosure.

In one form, each of the central robotic system 202, the IAR system 204, and the MPR system 206 include a controller for controlling operations of the respective robot. More particularly, referring to FIG. 3A, the rotor assembly system includes a control system 300 to control and coordinate movement of the central robotic system 202, the IAR system 204, and the MPR system 206. In one form, the control system 300 includes a central robotic system (CRS) controller 302, an IAR controller(s) 304, and an MPR controller 306 (collectively "controllers 302, 304, 306") for the central robotic system 202, the IAR system 204, and the MPR system 206, respectively. The various controller 302, 304, 306 are communicably coupled to one another (wired and/or wireless) to coordinate operations and perform the plurality of rotor manufacturing processes. In one form, each of the controllers 302, 304, 306 controls the respective robot using force control feedback, and may notify other controllers 302, 304, 306 if an abnormal operation occurs. In addition to controlling the central robot 220, the CRS controller 302 is configured to control the conveyor platform 222 to move the central robot 220 to the desired location along the cell 200

Figure 3B:
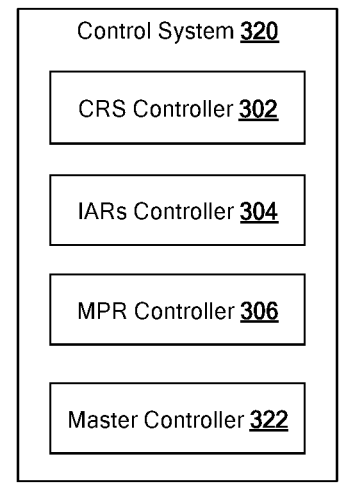

In another form, a master controller may be provided to coordinate movement between the controllers 302, 304, 306. For example, referring to FIG. 3B, a control system 320 includes a master controller 322 in addition to the controllers 302, 304, 306. In this example, the master controller 322 is communicably coupled to each of the controller 302, 304, 306 and is configured to coordinate operations between the robotic systems 202, 204, and 206 and track abnormal operations.

While specific examples of a control system are provided, the control system may be configured to include one or more controllers to control the central robotic system 202, the IAR system 204, and the MPR system 206 to perform the rotor manufacturing processes described herein. And, thus, should not be limited to the examples provided herein.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality, such as, but not limited to, movement drivers and systems, transceivers, routers, input/output interface hardware, among others; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

What is claimed is:

1. A rotor assembly system for a manufacturing cell, the system comprising:
   a central robotic system comprising a multi-axial central robot and a conveyor platform, wherein the conveyor platform is operable to move the multi-axial central robot within the cell; and
   one or more multi-axial auxiliary robotic systems secured at one or more locations within the cell, wherein:
   the central robotic system and the one or more auxiliary robotic systems are configured to perform a plurality of rotor manufacturing processes on at least one rotor component in coordination with one another, and
   the central robotic system is configured to transfer the at least one rotor component between one or more rotor manufacturing processes of the plurality of rotor manufacturing processes.

2. The rotor assembly system of claim 1, wherein the one or more auxiliary robotic systems includes:
   an insert assembly robotic (IAR) system including a multi-axial insert assembly robot to perform, in association with the central robotic system, a core stack assembly process as part of the plurality of rotor manufacturing processes, wherein, for the core stack assembly process:
the central robotic system is configured to place a rotor core from among a plurality of rotor cores on a mandrel, and
the IAR system is configured to, for each of the plurality of rotor cores, place a plurality of magnetizable inserts into a plurality of cavities in the rotor core.

3. The rotor assembly system of claim 2, wherein the central robotic system is configured to perform a selected rotor manufacturing processes among the plurality of rotor manufacturing processes while the IAR system places magnetizable inserts into the rotor core and return to the core stack assembly process prior to all of the magnetizable inserts being in the cavities.

4. The rotor assembly system of claim 3 further comprising a control system configured to control and coordinate movement of the central robotic system, the IAR system, and the MPR system.

5. The rotor assembly system of claim 4, wherein the plurality of rotor manufacturing processes includes a pre-mold-press process performed prior to the mold-press process and a post-mold-press process performed after the mold-press process.

6. The rotor assembly system of claim 5, wherein:
the central robotic system is configured to perform a selected rotor manufacturing processes among the plurality of rotor manufacturing processes while the IAR system places magnetizable inserts into the rotor core and return to the core stack assembly process prior to all of the magnetizable inserts being in the cavities, and
the selected rotor manufacturing process is the pre-mold-press process, mold-press process, the post-mold-press process, or a combination thereof.

7. The rotor assembly system of claim 6, wherein:
the pre-mold-press process includes a first weighing process of the rotor component, a preheating process of the rotor component, or a combination thereof, and
the post-mold-press process includes a press tool removal process, a second weighing process of the rotor component, a cleaning process, or a combination thereof.

8. The rotor assembly system of claim 2, wherein the one or more auxiliary robotic systems includes a mold-press robotic (MPR) system including a multi-axial mold-press robot to perform, in association with the central robotic system, a mold-press process as part of the plurality of rotor manufacturing processes, the mold-press process is performed subsequent to the core stack assembly process.

9. The rotor assembly system of claim 8, wherein, for the mold-press process:
the MPR system is configured to position a press tool onto the rotor component,
the central robotic system is configured to transfer the rotor component with the press tool to a transfer mold press and remove the rotor component with the press tool after a press operation by the transfer mold press, and
the MPR system is configured to remove the press tool from the rotor component.

10. The rotor assembly system of claim 1, wherein the one or more auxiliary robotic systems includes a mold-press robotic (MPR) system including a multi-axial mold-press robot to perform a mold-press process as part of the plurality of rotor manufacturing processes in association with the central robotic system.

11. The rotor assembly system of claim 10, wherein the one or more auxiliary robotic systems includes an insert assembly robotic (IAR) system including a multi-axial insert assembly robot to perform, in association with the central robotic system, a core stack assembly process as part of the plurality of rotor manufacturing processes, the core stack assembly process being performed prior to mold-press process.

12. A method of assembling a rotor, the method comprising:
providing a central robotic system having a multi-axial central robot and a conveyor platform at a manufacturing cell, wherein the conveyor platform is operable to move the multi-axial central robot within the cell; and
providing one or more multi-axial auxiliary robotic systems secured at one or more locations within the manufacturing cell, wherein:
the central robotic system and the one or more auxiliary robotic systems are configured to perform a plurality of rotor manufacturing processes on at least one rotor component in coordination with one another, and
the central robotic system is configured to transfer the at least one rotor component between one or more rotor manufacturing processes among the plurality of rotor manufacturing processes.

13. The method of claim 12, wherein the one or more auxiliary robotic systems includes an insert assembly robotic (IAR) system including a multi-axial insert assembly robot to perform, in association with the central robotic system, a core stack assembly process as part of the plurality of rotor manufacturing processes, wherein, for the core stack assembly process, the method further comprises:
placing, by the central robotic system, a rotor core from among a plurality of rotor cores on a mandrel; and
for each of the plurality of rotor cores, placing, by the IAR system, a plurality of magnetizable inserts into a plurality of cavities in the rotor core.

14. The method of claim 13 further comprising:
performing, by the central robotic system, a selected rotor manufacturing processes among the plurality of rotor manufacturing processes while the IAR system places magnetizable inserts into the rotor core; and
returning the central robotic system to the core stack assembly process prior to all of the magnetizable inserts being placed in the cavities.

15. The method of claim 13, wherein the one or more auxiliary robotic systems further includes a mold-press robotic (MPR) system including a multi-axial mold-press robot to perform, in association with the central robotic system, a mold-press process as part of the plurality of rotor manufacturing processes, the mold-press process is performed subsequent to the core stack assembly process.

16. The method of claim 15, wherein for the mold-press process, the method further comprises:
positioning, by the MPR system, a press tool onto the rotor component;
transferring, by the central robotic system, the rotor component with the press tool to a transfer mold press;
removing, by the central robotic system, the rotor component with the press tool after a press operation by the transfer mold press; and
removing, by the MPR system, the press tool from the rotor component.

17. The method of claim 15, wherein the plurality of rotor manufacturing processes includes a pre-mold-press process performed prior to the mold-press process and a post-mold-press process performed after the mold-press process.

18. The method of claim 17, wherein:
- the pre-mold-press process includes a first weighing process of the rotor component, a preheating process of the rotor component, or a combination thereof, and
- the post-mold-press process includes a press tool removal process, a second weighing process of the rotor component, a cleaning process, or a combination thereof.

* * * * *